United States Patent
Graupner

(10) Patent No.: US 7,907,544 B2
(45) Date of Patent: Mar. 15, 2011

(54) OVERLAY NETWORK FOR LOCATION-INDEPENDENT COMMUNICATION BETWEEN COMPUTER SYSTEMS

(75) Inventor: Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2748 days.

(21) Appl. No.: 10/387,456

(22) Filed: Mar. 14, 2003

(65) Prior Publication Data

US 2004/0179481 A1    Sep. 16, 2004

(51) Int. Cl.
*H04L 12/28* (2006.01)
*G06F 15/177* (2006.01)
(52) U.S. Cl. .................................... 370/254; 709/222
(58) Field of Classification Search .................. None
See application file for complete search history.

(56) References Cited

U.S. PATENT DOCUMENTS

| | | | |
|---|---|---|---|
| 6,073,012 A * | 6/2000 | Vanden Heuvel et al. | 455/427 |
| 6,792,430 B1 * | 9/2004 | Kenyon et al. | 707/102 |
| 7,185,052 B2 * | 2/2007 | Day | 709/203 |
| 7,185,077 B1 * | 2/2007 | O'Toole et al. | 709/223 |
| 7,188,173 B2 * | 3/2007 | Anderson et al. | 709/225 |
| 7,401,132 B1 * | 7/2008 | Krumel et al. | 709/220 |
| 7,613,796 B2 * | 11/2009 | Harvey et al. | 709/220 |
| 7,656,868 B2 * | 2/2010 | Jonsson | 370/389 |
| 2002/0093956 A1 * | 7/2002 | Gurin | 370/389 |
| 2003/0159067 A1 * | 8/2003 | Stirbu | 713/201 |
| 2004/0054807 A1 * | 3/2004 | Harvey et al. | 709/243 |
| 2006/0036719 A1 * | 2/2006 | Bodin et al. | 709/223 |

* cited by examiner

*Primary Examiner* — Gregory B Sefcheck

(57) ABSTRACT

A computer network system having an overlay network, which comprises of a plurality of nodes and an initiator node connected via a reference. The generalized references are links, which interconnect the nodes and form an overlay topology. The system uses position information in the overlay topology for message routing between participating applications in the overly network. The automatic generation of path-based service identifiers and service locations is another aspect of the system.

18 Claims, 4 Drawing Sheets

OVERLAY NETWORK FOR LOCATION-INDEPENDENT COMMUNICATION BETWEEN COMPUTER SYSTEMS

FIELD OF THE INVENTION

This invention relates generally to an overlay network. More particularly, this invention relates to establishing an overlay network for a computer system.

BACKGROUND OF THE INVENTION

The Internet today consists of a collection of interconnected administrative domains. Each domain is under the control of one or more administrators who decide what hardware equipment to employ and what control software to run. This localized control of the administrative domains requires the coexistence of a number of disparate, heterogeneous systems. The basic communication protocol through which different domains communicate is IP (Internet Protocol). Each Internet data communication is translated into the delivery of a sequence of varying sized IP protocol packets that travel across one or more administrative domains until they reach the final destination.

Another aspect is that IP routing between compute systems applies at the physical network layer. Physical networks change as components change. In order to hide those changes from applications running on compute systems and communicating with one another, using addresses of physical locations, physical computer systems where applications reside, should be avoided in communication between applications on different computer systems. The reason is that physical locations may become subject to change when changes in the physical network environment occur. The proposed overlay network layer instead uses communication paths established between communicating applications instead of physical (IP) addresses in the underlying network.

The invention consists of the method how those communication paths are automatically established during initial deployment of applications of one or more computer systems, and a message routing system that is based on the established communication paths. Communication paths remain constant throughout the existence of an application independently of changes eventually occurring in the underlying physical networks.

Reconfiguration of applications regarding their communication facilities are avoided that otherwise (without using the proposed overlay network) would be required. The invention can also be applied in environments where applications are not directly exist on physical compute systems, but on virtual compute systems, which are compute systems that are comprised of virtualized resources.

In IP, the sender of the data only specifies the destination address, whereas the network (the collection of hardware and software systems distributed through several administrative domains) chooses a forwarding path through which to route the IP packets. Routing protocols cooperate across different administrative domains, and through a variety of different software and hardware techniques, to monitor the presence and/or the state of connections in the Internet. Because of the great size and heterogeneous nature of the Internet, and the complexity of the routing task, these routing protocols are typically minimalistic and tend to focus on guarantee of connection and minimizing routing hops rather than optimizing performance. Overlay networks have been used to overcome these challenges.

An overlay network of alternate routing mechanisms may be typically constructed on top of the existing Internet routing mechanisms to find and exploit available resources. An overlay routing mechanism is typically completely transparent and separate from the Internet routing protocols and is preferably deployed throughout some small, but widely distributed, portion of the Internet as a distributed user application.

Typically, an overlay network consists of nodes intended communication on a network such as the Internet. These nodes are connected to the underlying network via transmission links. Overlay network nodes utilize existing network transmission lines and infrastructure, via network links to create a virtual topology.

However, the prior art overlay network nodes typically communicate using existing, established Internet protocols such as IP addresses and are very sensitive to changes by the underlying network and applications.

SUMMARY OF THE INVENTION

According to an embodiment of the invention, the invention is a method for establishing on overlay topology, such that the method comprising the steps of: establish a plurality of nodes, such that each node is located in a predetermined data center; and generating references among the established nodes, such that the established nodes are represented independently of the respective predetermined data center.

According to another embodiment of the invention, the invention is a method for using position information in the overlay topology for automatic generation of service identifiers comprising the steps of generating a local name for each individual cluster; concatenating the local name with a nodes own identification path; and passing the concatenated path on a descendent nodes.

According to yet another embodiment of the invention, the invention is an overlay network for computer network comprising: a plurality of nodes; an initiator node; and a plurality of network domains.

DETAILED DESCRIPTION OF A PREFERRED EMBODIMENT

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
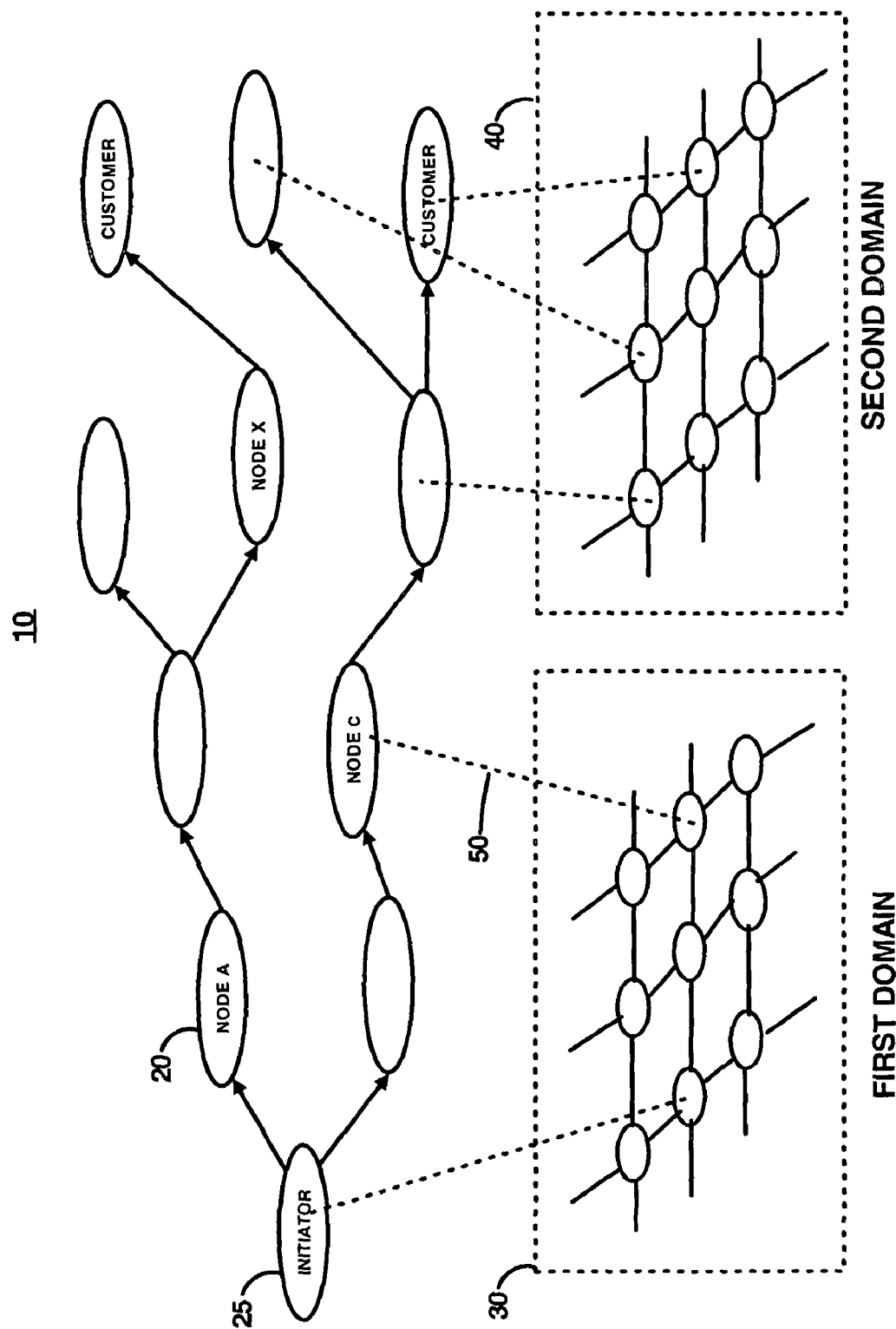
FIG. 1 illustrates a diagram of an overlay network, according to an embodiment of the invention.

FIG. 1 illustrates a diagram of an overlay network 10, according to an embodiment of the invention. The overlay network 10 includes a plurality of nodes 20 including an initiator node 25, first network domain 30, and second network domain 40. The nodes 20 are connected to each other and the first and second network domains 30, 40 via references 50.

The nodes 20 are protocol handlers which may reside on computer systems that host a plurality services. The nodes 20 may perform and control deployment processes based on received configuration data. One of ordinary skill can recognize that the nodes 20 may be implemented in plurality of different ways, for example, as servlets behind web servers or as daemon processes. The nodes 20 may be associated with the boot image and automatically started.

The initiator node 25 is a software agent that is of a kind known in the art. At its installation, the initiator node 25 generates other nodes 20 which in turn may generate more may generate more nodes 20. The resulting nodes 20 exist in a hierarchical relationship, extending from the initial initiator node 25 down the "children" nodes 20. The overly network consists of the initiator nodes 25 and the plurality of resulting children nodes 20.

The initiator node 25 passes a reference to itself on to all its descendant nodes (i.e., nodes that are connected to the initiator node 25 by a reference). The descendant nodes may pass their own references to their descendants. Each node 20 stores the reference to its initiator node 25 and refers to all its descendants.

As stated above, references 50 link nodes 20. One of ordinary skill can appreciate that the references can materialize in a plurality of different forms.

As shown in FIG. 1, the overly network 10 is overlaying a first underlying network domain 30 and a second underlying network domain 40. One of ordinary skill in the art can appreciate that the number of underlying networks is for illustrative purposes only and not meant to be restrictive. The first and second underlying networks 30 and 40 may be different customers, management domains. The first and second underlying networks 30 and 40 may be such computer networks such as Ethernet or other type computer networks having a plurality of computers connected via a specific protocol. The topology of the underlying networks 30 and 40 may be a grid structure, distinct from the hierarchical topology from the overlay structure 10.

FIG. 1 illustrates dashed lines connecting a node 20 in the overlay network 10 to an individual computer system in either the first or second underlying network 30 and 40. The dashed lines indicates that each node 20 in the overly network 10 is assigned to one physical hosting node in the underlying network.

Figure 2:
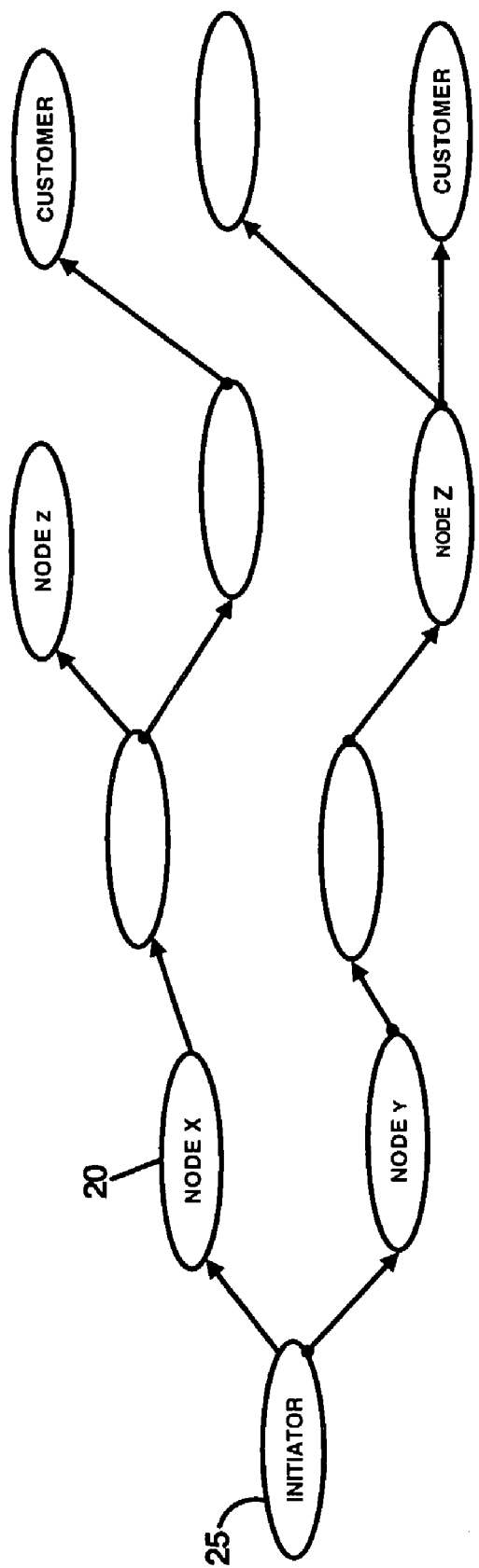
FIG. 2 illustrates a diagram of the automatic generation of instance identifiers based on their position in the overlay network topology, according to an embodiment of the invention.

FIG. 2 illustrates a diagram of the automatic generation of node identifiers based on their position in the overlay network 10 topology. The diagram illustrates an overlay network 10 consisting of a plurality of nodes 20. The plurality of nodes 20 are connected via a reference 50. The paths 50 are generated by each individual node, connecting a higher-level node 20 (parent) with a lower level node 20 (child).

The paths 50 connecting the nodes 20 may allow nodes 20 to be identified in the topology. A richer schemata (model) is possible, as well as specifying an originating point from where a path originates. One of ordinary skill may appreciate that any node (not just the highest-level node) may act as a start point. Also, multiple paths may be used to identify a node 20. Using such schemata may avoid the highest-level node 20 from being a single point of failure.

FIG. 2, for example, is an illustration of path: /hp_mgmt_domain/dc_paloalto/cluster_21/customer x. As shown in FIG. 2, hp_mgmt_domain is the highest-level node 20, and is connected to dc_paloalto via reference 50. Hp_mgmt_domain may be a high-level system server and dc_paloalto is local client server. A network cluster (cluster_21) connects dc_paloalto with customer x. Therefore, in order for the high-level server (hp_mgmt_domain) to communicate with customer x, it must send information along the above stated path. Also, note that other customers (customer_y) and high-level servers (oracle_db) may also be connected to the nodes via different paths.

As shown in FIGS. 1 and 2, the overly network 10 is a plurality of connected nodes, such that each nodes represents a service or server (not shown) in a distributed computer system. These services and servers may come from distinct sources and numerous environments. The overly network 10 may use generalized references 50 as a way to provide underlying network diversity and a uniform view of the system. One of ordinary skill in the art will appreciate that the references 50 may materials in a plurality of different formats, such as: traditional addresses or universal resource locators (URL), X.500 style lists of attribute-value pairs, textual descriptions of neighbor services that are later resolved into addresses in a known manner, unified messaging techniques that provide abstractions from email addresses or phone numbers, location-independent, persistent universal resource names (URN). One of ordinary skill in the art can also appreciate that this list is illustrative in nature and is not meant as the entire list or scope of formats, which may be used as references 50.

Figure 3:
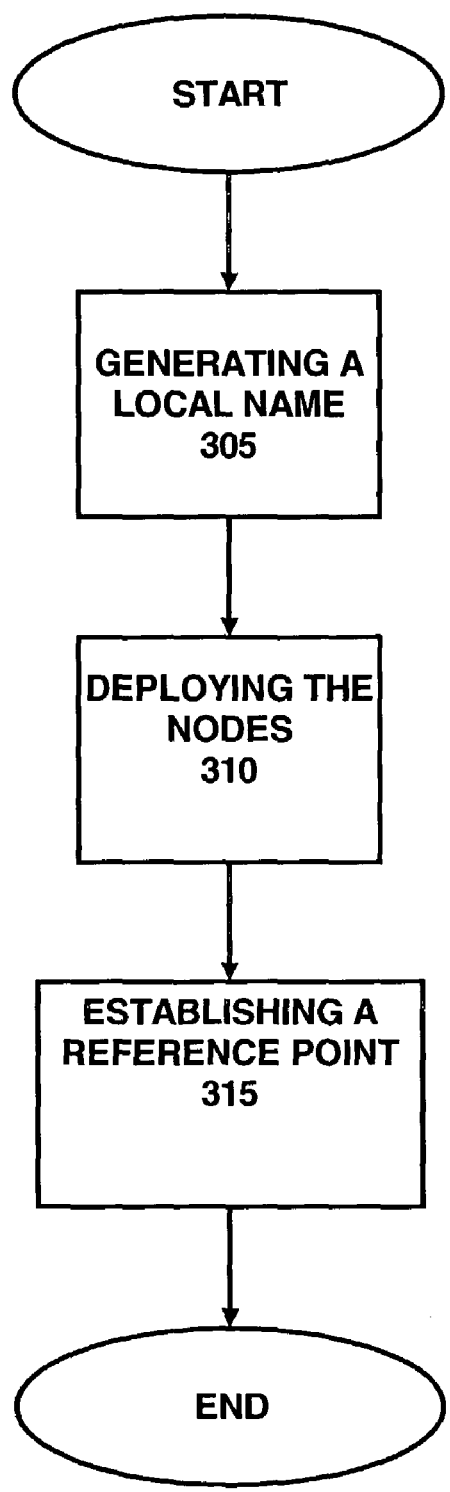
FIG. 3 illustrates of an exemplary method, according to an embodiment of the invention.

FIG. 3 illustrates a flow-chart of a method for establishing a node and reference in a server, in accordance with an embodiment of the invention. As stated above with regards to FIG. 1, the overlay 10 network is comprised of a plurality of nodes connected by references 50. However, for the overlay network to be created, there is a software program, which is called an initiator. The initiator generates the nodes and references in a predetermined server, thereby connecting the server to the overlay network 10.

In step 305, the initiator generates a local name for server. For example, as shown with regards to FIG. 2, the node may have a name that reflects its level in the overall network (i.e., customer x). However, one of ordinary skill in the art may appreciate that the name itself is arbitrary and depends on the designer.

In step 310, the initiator deploys a node. The node typically is a software agent stored on a server, which receive and store control information. Typically, the node program registers with a directory (not shown) stored in a hosting server. Registration is based on a set of attributes the node obtains from the hosting server (i.e., domain-specific attributes). The node may locate the directory to which it will register with by obtaining an explicit address of the directory with other attributes from the hosting environment. Also, it may locate the directory by issuing a resolution name request that may be resolved in the network's DNS environment to the appropriate directory address. A directory contains description of the nodes based on registration of attributes including locations and initial contact information. A directory also contains a description of service instances including their position in the overlay network 10 created during the deployment process.

Once a node had been deployed in the hosting server, the method establishes a reference pointing to the descendent, as shown in step 315. The deployed node stores a reference to its creator and refers to all its descendants.

In step 320, a reference point is established pointing to its creator and refers to all its descendants. Reference points may be initially established during service deployment. Each node passes a reference to itself on to all its descendants that will pass their own reference on to all their descendants. Each deployed node stores the reference to its creator and references to all its descendants. Further references may be established as well as such references to siblings or references to services to which dependencies exist. One of ordinary skill in the art can appreciate that any service relationship may be expressed by a node reference, and a multiple of overlay networks may be formed upon the same set of services.

Figure 4:
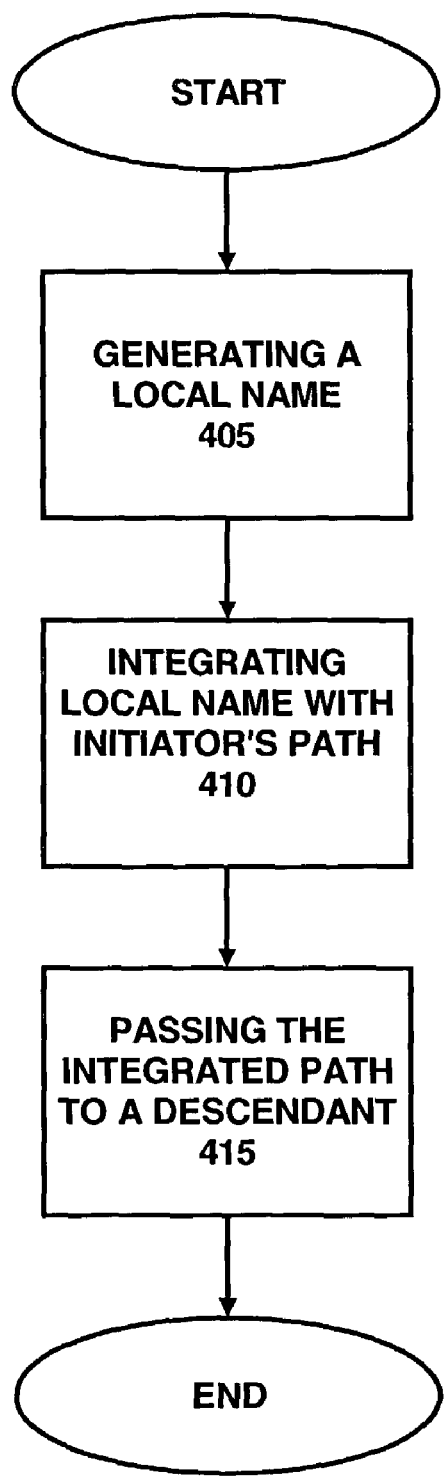
FIG. 4 illustrates of an exemplary method, according to an embodiment of the invention.

FIG. 4 illustrates a flow-chart of a method for using position information in the overlay topology for automatic generation of service identifiers. An overlay topology 10 can be used to automatically derive node identification information from the position of the node in the topology.

Step 405, a local name is generated for each individual cluster. One of ordinary skill in the art can appreciate that a user or system administrator may determine the local name.

In step 410, the method concatenates the local name with nodes own identification path. This is done at the software level in a manner known in the prior art.

In step 420, the method passes the concatenated path on the descendent nodes as its identification path. Paths through the topology may be automatically derived during the node deployment process.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for establishing an overlay network topology, the method comprising:
    using an initiator node in the overlay network to establish a plurality of nodes in a redetermined service such that each node is located in a predetermined data center;
    using the initiator node to generate references among the established nodes in the predetermined service such that the established nodes are represented independently of the respective predetermined data centers; and
    generating node identifiers for the plurality of nodes based on positions of the plurality of nodes in the overlay network.

2. The method of claim 1, wherein the initiator node is a software program stored on a server, such that the initiator node connects the server to the overlay topology.

3. The method of claim 1, further comprising the steps of:
    generating a local name for a server;
    deploying one of the plurality of nodes for the server; and
    establishing a reference pointing the one node to a creator node of the one node; and
    referring the one node to all descendant nodes of the one node.

4. The method of claim 3, wherein the one node is a software agent stored on the server, which receives and stores control information.

5. The method of claim 4, wherein the software agent includes a node program that registers with a directory stored in a hosting server.

6. The method of claim 5, wherein the node locates the directory to which it will register with by obtaining an explicit address of the directory with other attributes from the hosting server or it locates the directory by issuing a resolution name request that is resolved in the network's DNS environment to the appropriate directory address.

7. The method of claim 3, wherein the reference is initially established during service deployment.

8. A method for using position information in an overlay network for automatic generation of a service path identifier comprising:
    generating, as initiated by an initiator node, a cluster node in the overlay network for an individual cluster that hosts a service
    generating a local name for the cluster node of the individual cluster;
    concatenating the local name with the initiator node's own identification path of the cluster node to form a concatenated path; and
    passing the concatenated path to the cluster node so that the concatenated path becomes the service path identifier for the service hosted by the cluster node, wherein the service path identifier is based on the position of the cluster node in the overlay network.

9. The method of claim 8, wherein the path through the overlay network is automatically derived during the node deployment process.

10. An overlay network for a computer network comprising:
    a plurality of nodes;
    an initiator node configured to generate at least a first node of the plurality of nodes, wherein the first node is in turn configured to generate at least a second node of the plurality of nodes such that the plurality of nodes exist in a hierarchical relationship with the second node being a descendent node of the first node, and both the first and second nodes being descendent nodes of the initiator node, wherein the initiator node is further configured to generate node identifiers for the plurality of nodes based on positions of the plurality of nodes in the overlay network; and
    a plurality of network domains.

11. The network of claim 10, wherein the plurality of nodes are connected to each other and to the plurality of network domains via references.

12. The network of claim 11, wherein the plurality of nodes may perform and control deployment processes based on received configuration data.

13. The network of claim 10, wherein the plurality of nodes are protocol handlers which may reside on computer systems that host a plurality services.

14. The network of claim 10, wherein the initiator node is a software agent.

15. The network of claim 10, wherein the initiator node passes a reference to itself on to all its descendant nodes in the plurality of nodes.

16. The network of claim 10, wherein the overlay network is overlaying the plurality of network domains.

17. The network of claim 16, wherein the plurality of network domains include computer networks of at least one of Ethernet or other type computer networks having a plurality of computers connected via a specific protocol.

18. The network of claim 17, wherein a topology of the plurality of network domains is a grid structure, distinct from the hierarchical topology from an overlay structure of the overlay network.

* * * * *

UNITED STATES PATENT AND TRADEMARK OFFICE
CERTIFICATE OF CORRECTION

| | | |
|---|---|---|
| PATENT NO. | : 7,907,544 B2 | Page 1 of 1 |
| APPLICATION NO. | : 10/387456 | |
| DATED | : March 15, 2011 | |
| INVENTOR(S) | : Sven Graupner | |

It is certified that error appears in the above-identified patent and that said Letters Patent is hereby corrected as shown below:

In column 5, line 35, in Claim 1, delete "redetermined" and insert -- predetermined --, therefor.

Signed and Sealed this
Sixteenth Day of August, 2011

David J. Kappos
*Director of the United States Patent and Trademark Office*